(12) United States Patent
Choi et al.

(10) Patent No.: US 7,711,250 B2
(45) Date of Patent: May 4, 2010

(54) APPARATUS FOR RECEIVING TRANSPORT STREAM TO PROVIDE MULTI-SCREEN AND CONTROL METHOD THEREFOR

(75) Inventors: Jeong-Seok Choi, Seoul (KR); Chang-Sup Shim, Seoul (KR); Yun-Je Oh, Yongin-si (KR); Jun-Ho Koh, Suwon-si (KR); Jeong-Rok Park, Hwaseong-si (KR); Kwan-Lae Kim, Suwon-si (KR)

(73) Assignee: Samsung Electronics Co., Ltd., Maetan-Dong, Yeongtong-Gu, Suwon-Si, Gyeonggi-do (KR)

( * ) Notice: Subject to any disclaimer, the term of this patent is extended or adjusted under 35 U.S.C. 154(b) by 1145 days.

(21) Appl. No.: 11/331,980

(22) Filed: Jan. 13, 2006

(65) Prior Publication Data
US 2006/0176396 A1  Aug. 10, 2006

(30) Foreign Application Priority Data
Jan. 27, 2005  (KR)  ...................... 10-2005-0007604

(51) Int. Cl.
*H04N 7/26*  (2006.01)
(52) U.S. Cl. .................. 386/109; 348/474; 725/118
(58) Field of Classification Search ................. 386/109; 348/474; 725/118
See application file for complete search history.

(56) References Cited

U.S. PATENT DOCUMENTS

| 5,045,946 A * | 9/1991 | Yu .............................. 348/565 |
| 6,356,667 B1 * | 3/2002 | Fukuhara ..................... 382/248 |
| 2002/0054608 A1 * | 5/2002 | Wan et al. ................... 370/474 |
| 2005/0212968 A1 * | 9/2005 | Ryal .......................... 348/565 |

FOREIGN PATENT DOCUMENTS

| JP | 2004-193673 | 7/2004 |
| JP | 2004-266334 | 9/2004 |

\* cited by examiner

*Primary Examiner*—Thai Tran
*Assistant Examiner*—Girumsew Wendmagegn
(74) *Attorney, Agent, or Firm*—Cha & Reiter, LLC

(57) ABSTRACT

Disclosed is an apparatus and method for constructing and broadcasting a multi-screen broadcasting program by using a transport stream in a digital broadcasting, and for decoding the constructed transport stream to restore image and voice signals. The method includes the steps of analyzing a program access table (PAT) of broadcasting data to determine whether there are at least two image packets, performing signal decoding when the input broadcasting data is a single screen program having one image packet, performing a multi-decoding when the input broadcasting data is a multi-screen program having at least two image packets.

16 Claims, 6 Drawing Sheets

APPARATUS FOR RECEIVING TRANSPORT STREAM TO PROVIDE MULTI-SCREEN AND CONTROL METHOD THEREFOR

CLAIM OF PRIORITY

This application claims the benefit of an earlier application entitled "Apparatus For Receiving Transport Stream To Provide Multi-Screen And Control Method Therefor," filed in the Korean Intellectual Property Office on Jan. 27, 2005 and assigned Serial No. 2005-7604, the entire contents of which are incorporated herein by reference.

BACKGROUND OF THE INVENTION

1. Field of the Invention

The present invention relates to constructing and broadcasting a multi-screen broadcasting program using a transport stream in digital broadcasting, and more particularly to an apparatus and method for decoding the constructed transport stream to restore image and voice signals.

2. Description of the Related Art

Recently, digital broadcasting services have been provided through a broadcasting system based on ISO (International Organization for Standard)/IEC (International Electrotechnical Commission) 13818-1 and ISO/IEC 13818-2, which are international standards.

The ISO/IEC 13818-2 refers to MPEG-2 video data and is an international standard for compressing a moving image. The ISO/IEC 13818-1 is an international standard for multiplexing compressed image data, voice data, and additional data in a broadcasting transmission side. It also relates to demultiplexing this data in the broadcasting reception side, so as to transmit this data at one time. The additional data includes synchronization information for synchronizing the image data and voice data in the broadcasting reception side, e.g., information about a program, etc.

There are two types of MPEG-2 systems. One type is called a "program stream", which includes a single program as MPEG-1 system. The other type is called a "transport stream", which is designed to transmit bit streams and may include a plurality of programs.

FIG. 1 is a block diagram illustrating the construction of a conventional broadcasting service system to provide a plurality of broadcasting content.

According to such conventional broadcasting service systems, as shown in FIG. 1, a broadcaster receives various digital broadcasting content, such as a news 101, a drama 102, and a football game 103, from a broadcasting content provider. Then, the broadcaster multiplexes the received digital broadcasting content through a multiplexer 11, and broadcasts the multiplexed content as a multi-program transport stream (MPTS) 100. In this case, the broadcasting of the contents is realized through a terrestrial wave, a satellite, a cable, etc.

A broadcasting splitter 12 in a subscriber side splits the broadcasted MPTS 100 into a plurality of single-program transport streams (SPTSs) 104-1 and 104-2 for each digital content. It then provides digital content 101 and 102 to subscribers according to the selection of each subscriber.

The MPTS 100, which is a broadcasting stream including a plurality of digital broadcasting content 101, 102, and 103, includes program ID (PID) information for each of the digital broadcasting content 101, 102, and 103 and the like. This enables, the digital broadcasting content 101, 102, and 103 to be split from each other through the broadcasting splitter 12 in the subscriber side.

Each digital broadcasting content is an SPTS, in which compressed image data, voice data, and additional data are included.

FIG. 2 illustrates the structure of an SPTS that includes image, voice, and data packets.

A transport stream for one broadcast is divided into image data 22 containing image information, audio data 24 containing audio information, and additional data 26 containing information relating to broadcasting and additional services. In addition, each data has a header 21, 23, or 25, in which information necessary for demultiplexing and decoding is recorded.

A transport stream header is added to the data structure shown in FIG. 2, thereby constructing and transmitting a transport stream. Herein, the procedure of constructing a transport stream has no direct relation with the present invention, so detailed description thereof will be omitted.

FIG. 3 is a block diagram of a conventional transport stream receiving apparatus in a digital broadcasting system.

A conventional transport stream receiving apparatus in a digital broadcasting system includes a channel classifying decoder 31, a transport stream demultiplexer 32, a video decoder 33, an audio decoder 35, and a data processing unit 34. The channel classifying decoder 31 receives a multi-program transport stream (MPTS) and the channel selection information input by the user and transmits only a single-program transport stream (SPTS) of a selected channel to the transport stream demultiplexer 32. The transport stream demultiplexer 32 demultiplexes the received SPTS, and separately outputs an image packet, a voice packet, and a data packet, which have been included in the SPTS. The video decoder 33 decodes the image packet. The audio decoder 35 decodes the voice packet. The data processing unit 34 decodes the data packet and provides the video decoder 33 and audio decoder 35 with a clock pulse for synchronizing voice and image data.

The clock pulse from the data processing unit 34 provides the time periods required for the decoding operation of the video decoder 33 and audio decoder 35. Accordingly, it is used to synchronize the voice and the image data.

TABLE 1

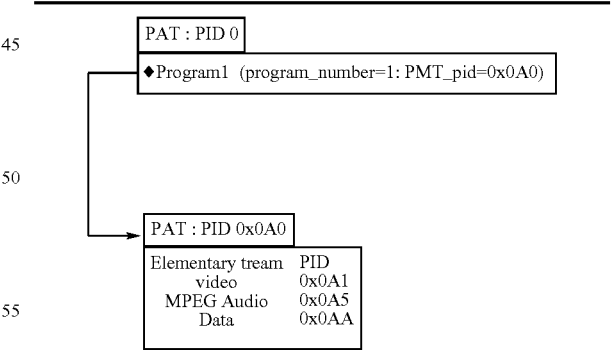

Table 1 illustrates a program access table (PAT) and a program mapping table (PMT). It is used by a program demultiplexed by the transport stream demultiplexer 32 in the conventional transport stream receiving apparatus for the digital broadcasting system.

Referring to Table 1, the PAT informs that there is one program (program_number) in a transport stream transmitted through a selected channel. The program ID (PMT_PID) of a channel selected by the user is "0x0A0". The transport stream demultiplexer 32 analyzes the PMT_PID (e.g. "0x0A0") corresponding to an appointed program_number obtained by analyzing the PAT.

The transport stream demultiplexer 32 analyzes the PMT having the program ID (PMT_PID) of "0x0A0." The transport stream demultiplexer 32 obtains PID information of a basic stream, video information (SDTV class or HDTV class) (e.g. "0x0A1") and audio information (MPEG audio or AC-3 audio) (e.g. "0x0A5" representing MPEG audio in Table 1). These are actual components of a program and information about data (e.g. "0x00AA") if it is necessary. The transport stream demultiplexer 32 transmits video, audio, and data information according to information included in Table 1 to corresponding decoders (e.g. decoders 33, 34, and 35). The transmitted information is decoded at a predetermined time and is output to an exterior device. This allows a user to view the relevant program.

As described above, a transport stream based on Table 1 is configured with a program which includes one piece of video information, one piece of audio information, and data information.

Meanwhile, a transport stream may include a multi-screen, which will now be described with reference to Table 2.

TABLE 2

| PAT: PID 0 |  |
| --- | --- |
| ♦ Multi_Screen_program1(program_number-1;PMT_PID-0x0A0) | |

| PMT : PID 0x0A0 | |
| --- | --- |
| Elementary stream | PID |
| Video 1 | 0x0A1 |
| Video 2 | 0x0A2 |
| Video 3 | 0x0A3 |
| Video 4 | 0x0A4 |
| MPEG Audio | 0x0A5 |
| Data | 0x0AA |

Table 2 illustrates a program access table (PAT) and a program mapping table (PMT). It is used by a program demultiplexed by the transport stream demultiplexer 32 of the conventional transport stream receiving apparatus. It can provide a multi-screen picture in a digital broadcasting system.

Referring to Table 2, the PAT informs that there is one program (program_number) in a transport stream transmitted through a selected channel. The program ID (PMT_PID) of the channel selected by the user is "0x0A0". The transport stream demultiplexer 32 analyzes the PMT_PID (e.g. "0x0A0") corresponding to an appointed program_number obtained by analyzing the PAT.

The transport stream demultiplexer 32 analyzes the PMT having the program ID (PMT_PID) of "0x0A0." The transport stream demultiplexer 32 obtains PID information of a basic stream, a plurality of video information (SDTV class or HDTV class) (e.g. "0x0A1", "0x0A2", "0x0A3", and "0x0A4") and audio information (MPEG audio, AC-3 audio, etc.) (e.g. "0x0A5" representing MPEG audio in Table 2). These are actual components of a program and information about data (e.g. "0x0AA") if it is necessary. The transport stream demultiplexer 32 transmits video, audio, and data information according to information included in Table 2 to corresponding decoders (e.g. decoders 33, 34, and 35). The transmitted information is decoded at a predetermined time and is output to an exterior device. This allows a user to view the relevant program.

However, in such conventional transport stream receiving apparatuses, a PMT must be analyzed in order to obtain information about a multi-screen. This is provided to improve the quality of a digital broadcasting service. Also it is impossible to control screen configuration based on priorities among a plurality of image information which form the multi-screen.

SUMMARY OF THE INVENTION

Accordingly, the present invention has been made to reduce or overcome the above-mentioned problems occurring in the prior art. One aspect of the present invention is to provide a transport stream receiving apparatus and method using a program access table (PAT) and a program mapping table (PMT). The transport stream receiving apparatus is configured to enable a multi-screen transport stream capable of providing a new type of broadcasting service. Accordingly, this provides users with various services relating to a multi-screen function, while also having precise information relating to multi-screen processing.

In accordance with one aspect of the present invention, an apparatus for receiving a transport stream in a digital broadcasting system is provided, the apparatus includes: a channel classifying decoder to receive a multi-program transport stream (MPTS) and output a single-program transport stream (SPTS) of a selected channel using channel selection information from a user, a transport stream demultiplexer to demultiplex the SPTS and output a plurality of packets (e.g. image packets, a voice packet, and a data packet), a video/audio decoder for decoding image/voice packets, a data processing unit for decoding a data packet, and providing the video/audio decoder with a clock pulse for synchronizing voice and image, and a multi-screen controller to receive selection information about a multi-screen from the user and to enable the video/audio decoder to process the multi-screen.

In accordance with another aspect of the present invention, a method for processing a multi-screen program in a transport stream receiving apparatus capable of providing the multi-screen in a digital broadcasting system is provided, the method including the steps of: a) analyzing a program access table (PAT) of broadcasting data to determine whether there are at least two image packets; b) performing signal decoding when the input broadcasting data is a single screen program having one image packet, and c) performing a multi-decoding when the input broadcasting data is a multi-screen program having at least two image packets.

BRIEF DESCRIPTION OF THE DRAWINGS

The present invention will be more apparent from the following detailed description taken in conjunction with the accompanying drawings, in which.

DETAILED DESCRIPTION

Figure 1:
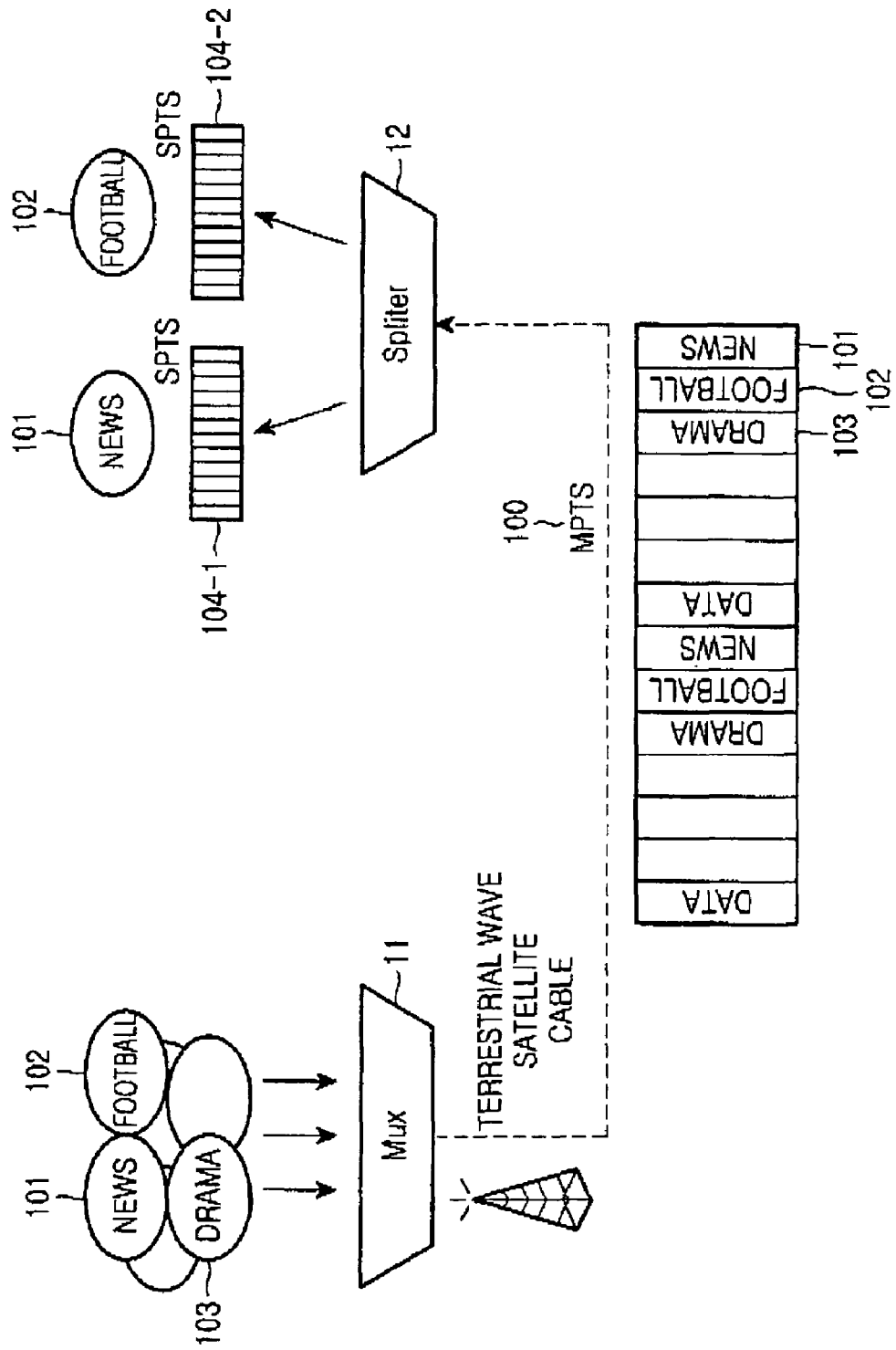
FIG. 1 is a block diagram of a conventional broadcasting service system to provide a plurality of broadcasting contents.
Figure 2:
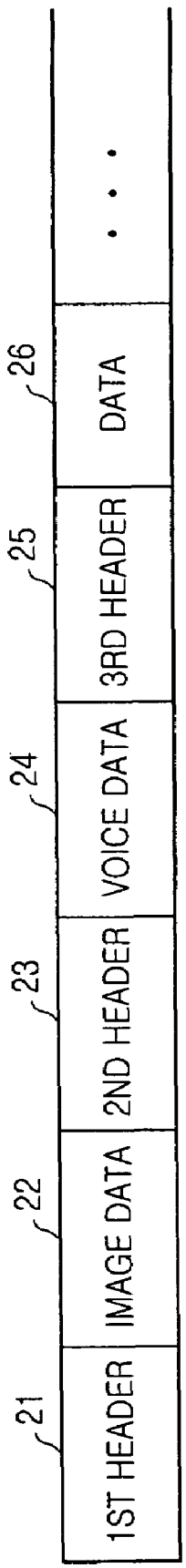
FIG. 2 illustrates the structure of an SPTS which includes image, voice, and data packets.
Figure 3:
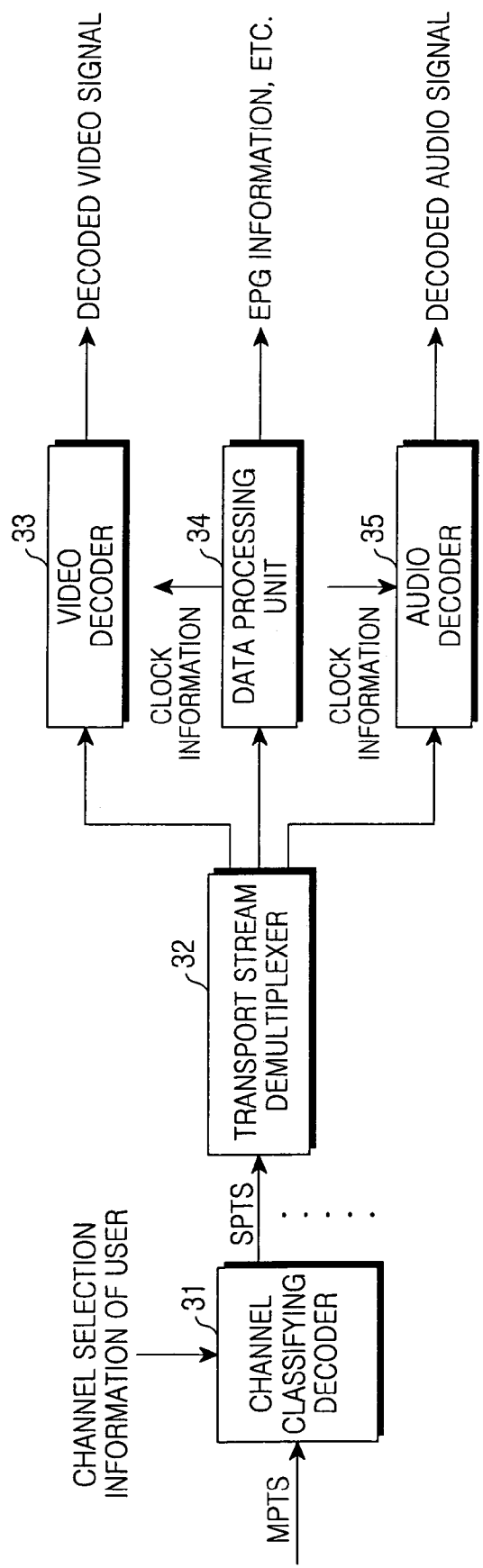
FIG. 3 is a block diagram of a conventional transport stream receiving apparatus in a digital broadcasting system.

Hereinafter, an embodiment according to the present invention will be described with reference to the accompanying drawings. It is to be noted that the same elements are indicated with the same reference numerals throughout the drawings. For the purposes of clarity and simplicity, a detailed description of known functions and configurations incorporated herein will be omitted as it may obscure the subject matter of the present invention.

A multi-screen program to be processed according to the present invention includes "n" pieces of image information, one piece of voice information, and data information per each program. Moreover, the multi-screen program refers to a program for displaying multiple screens along with one voice signal Therefore, a multi-screen transport stream (MSTS) includes "n" pieces of image information, one piece of voice information, and data information per each program. Herein, each piece of image information is one piece of independent image information capable of configuring one screen. Each of the image and voice information is decoded by one clock pulse information.

Figure 4:
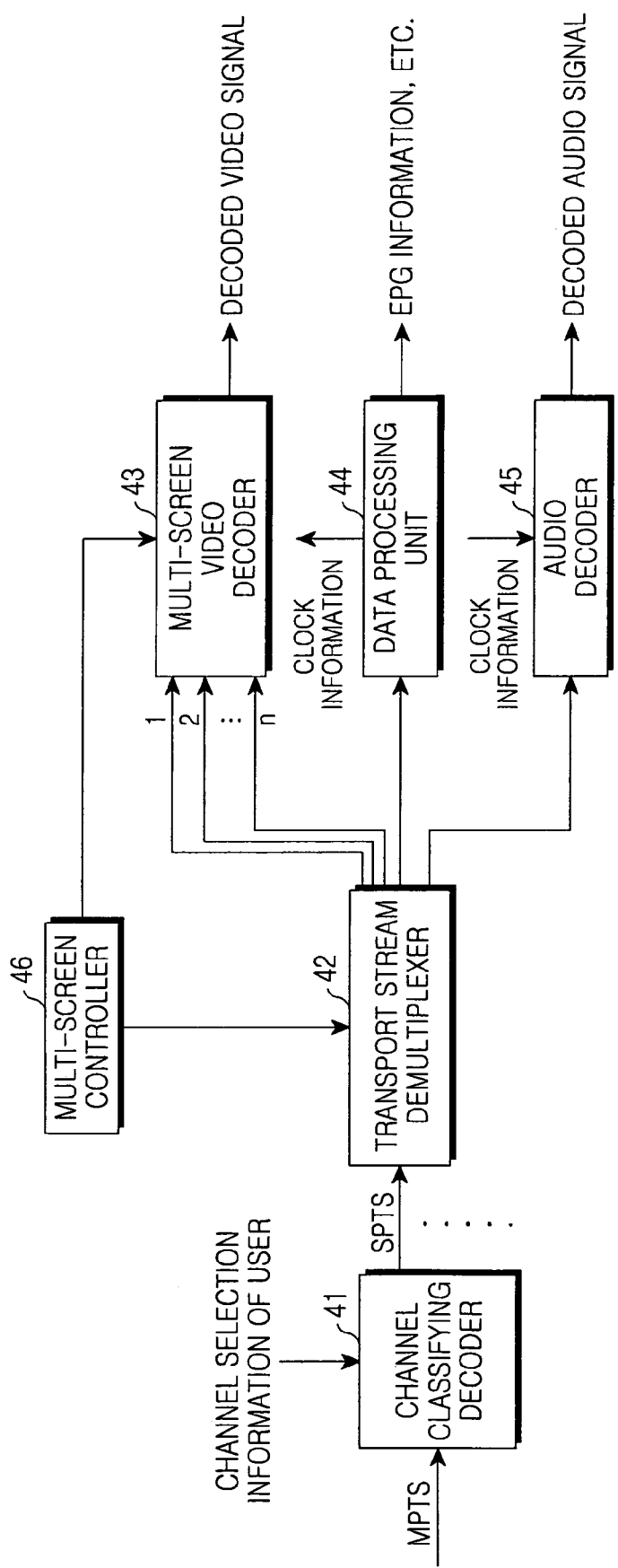
FIG. 4 is a block diagram of a transport stream receiving apparatus capable of providing a multi-screen picture in a digital broadcasting system according to an embodiment of the present invention.

FIG. 4 is a block diagram of a transport stream receiving apparatus capable of providing a multi-screen in a digital broadcasting system according to an embodiment of the present invention.

The transport stream receiving apparatus includes a channel classifying decoder 41, a transport stream demultiplexer 42, a video decoder 43, an audio decoder 45, a data processing unit 44, and a multi-screen controller 46. The channel classifying decoder 41 receives a multi-program transport stream (MPTS) and channel selection information input by the user. It transmits only a single-program transport stream (SPTS) of a selected channel to the transport stream demultiplexer 42. The transport stream demultiplexer 42 demultiplexes the received SPTS, and separately outputs a plurality of image packets, a voice packet, and a data packet, which have been included in the SPTS. The video decoder 43 decodes each of the image packets, and the audio decoder 45 decodes the voice packet. The data processing unit 44 decodes the data packet, and provides the video decoder 43 and audio decoder 45 with a clock pulse for synchronizing voice and image. The multi-screen controller 46 processes a multi-screen.

The clock pulse provided from the data processing unit 44 provides the time periods required for the decoding operation of the video decoder 43 and audio decoder 45. This enables synchronization of the voice and the image data.

The multi-screen controller 46 provides information about whether a screen is a single-screen or a multi-screen, the number of screens included in a multi-screen, and a position selecting signal for a screen. The video decoder 43 configures a multi-screen according to a control signal of the multi-screen controller 46. The construction of the video decoder 43 for configuring a multi-screen according to a control signal of the multi-screen controller 46 will later be described in detail with reference to FIG. 5.

TABLE 3

PAT : PID 0
♦ Multi_Screen_program1(program_number=1; PMT_PID=0x0A0)
  Reserved bits 0x03 (Screen_number=4)

PMT : PID 0x0A0
Elementary stream PID
Reserved bits 0x0
(Priority_Order_number=0)
    Video 1    0x0A1
    Video 2    0x0A2
    Video 3    0x0A3
    Video 4    0x0A4
  MPEG Audio  0x0A5
    Data      0x0AA Table 3 illustrates a program access table (PAT) and a program mapping table (PMT). It is used for a program demultiplexed by the transport stream demultiplexer 42 of the transport stream receiving apparatus capable of providing a multi-screen in a digital broadcasting system according to an embodiment of the present invention.

Referring to Table 3, the PAT informs that there is one program (program_number) in a transport stream transmitted through a selected channel. The program ID (PMT_PID) of the channel selected by the user is "0x0A0". In addition, 4 bits of the PAT for a transport stream, which have been reserve bits in the prior art, are defined as a screen number field (Screen_number field). This is used to inform the number of screens in the case of multi-screen broadcasting. For instance, when the number of screens (Screen_number) is "3", the "3" expresses the number of screens added to form a multi-screen. It is understood that the relevant multi-screen program includes 4 screens in total.

The transport stream demultiplexer 42 analyzes the PMT_PID (e.g. "0x0A0") corresponding to an appointed program_number that has been obtained by analyzing the PAT.

When the transport stream demultiplexer 42 analyzes the PMT having the program ID (PMT_PID) of "0x0A0." The transport stream demultiplexer 42 obtains PID information of a basic stream, video information (SDTV class or HDTV class) (e.g. "0x0A1", "0x0A2", "0x0A3", and "0x0A4") and audio information (MPEG audio, AC-3 audio, etc.) (e.g. "0x0A5" representing MPEG audio in Table 3). These are actual components of a program and information about data (e.g. "0x0AA") if it is necessary. In addition, according to an embodiment of the present invention, at least one of 18 reserved bits included in a PMT is defined and used as a priority order number field (Priority_Order_number field). Herein, the priority order number field is used to determine the priority of screens. For example, a video stream having a lower PID number has a higher priority when the priority order number field has a value of "0". A video stream having a higher PID number has a higher priority when the priority order number field has a value of "1". This may change depending on the setting. It will be understood by those skilled in the art that various priority setting schemes may be used for the present invention. Based on priority information included in the PAT, a decoding sequence of video signals and the output positions of multiple screens are changed. Herein, the fact that a video stream has a higher priority represents that a video stream having a lower PID number is output through a first port when the priority order number (Priority_Order_number) is "0". A video stream having a higher PID number is output through a first port when the priority order number (Priority_Order_number) is "1".

The transport stream demultiplexer 42 transmits video, audio, and data information according to information included in Table 4 to corresponding decoders (e.g. decoders 43, 44, and 45). The transmitted information is decoded at a predetermined time and is output to an exterior device. This allows a user to view the relevant program.

Figure 5:
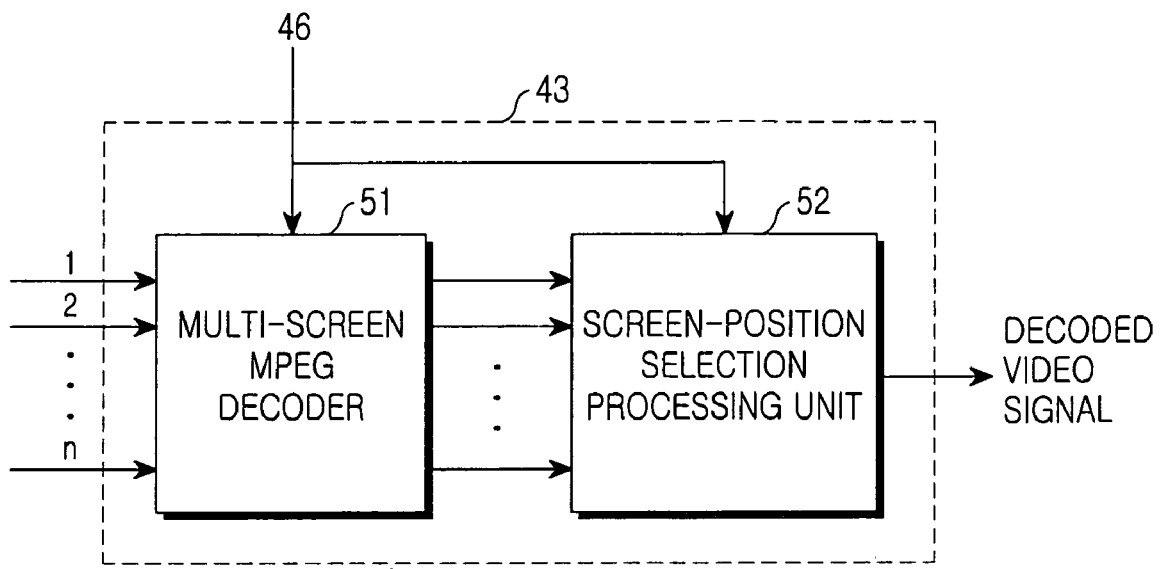
FIG. 5 is a detailed block diagram of a video decoder of a transport stream receiving apparatus capable of providing a multi-screen in a digital broadcasting system according to an embodiment of the present invention.

FIG. 5 is a detailed block diagram of a video decoder of a transport stream receiving apparatus capable of providing a multi-screen in a digital broadcasting system according to an embodiment of the present invention.

The video decoder of the transport stream receiving apparatus includes a multi-screen MPEG decoder 51 and a screen-position selection processing unit 52. The multi-screen MPEG decoder 51 receives a plurality of video packets for a multi-screen, and decodes each received video packet. The screen-position selection processing unit 52 processes a screen position configuration for the decoded video packets according to the control of the multi-screen controller 46.

The multi-screen MPEG decoder 51 includes as many decoders as the number of input video packets, in order to decode each of the input video packets. The screen-position selection processing unit 52 may include a switch and an image signal processing unit, in order to process a screen position configuration for the plurality of decoded video packets. The switch performs a switching operation with respect to input signals. The image signal processing unit integrates the switched video packets to form one image.

The transport stream receiving apparatus according to the present invention uses two control signals transferred from the multi-screen controller 46. First, based on a Screen_number (the number of screens) signal transmitted from the multi-screen controller 46 to the multi-screen MPEG decoder 51, it is determined whether a screen to be output is a single-screen or a multi-screen. In addition, when the screen to be output is a multi-screen, the number of video streams to be decoded for the output of the multi-screen is determined.

Screen configuration information from the user is transmitted from the multi-screen controller 46 to the screen-position selection processing unit 52. Thereafter, the image signal processing unit processes images and the switch performs a switching operation with respect to image signals input from the image signal processing unit. This allows a screen to be configured according to the desires of the user.

Figure 6:
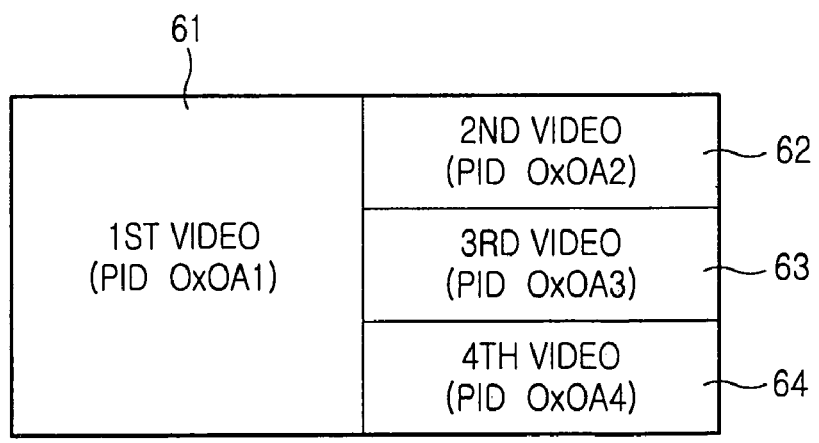
FIG. 6 illustrates the configuration of a multi-screen according to an embodiment of the present invention.

FIG. 6 illustrates the configuration of a multi-screen according to an embodiment of the present invention.

The multi-screen shown in FIG. 6 is configured with four screens. A first video 61 is set as a main screen and second, third, and fourth videos 62, 63, and 64 are set as sub-screens. The user may use a screen change service, which, for example, exchanges screen positions between the first video 61 and the third video 63. This can be done by using the screen configuration information of the user transferred to the screen-position selection processing unit 52.

Figure 7:
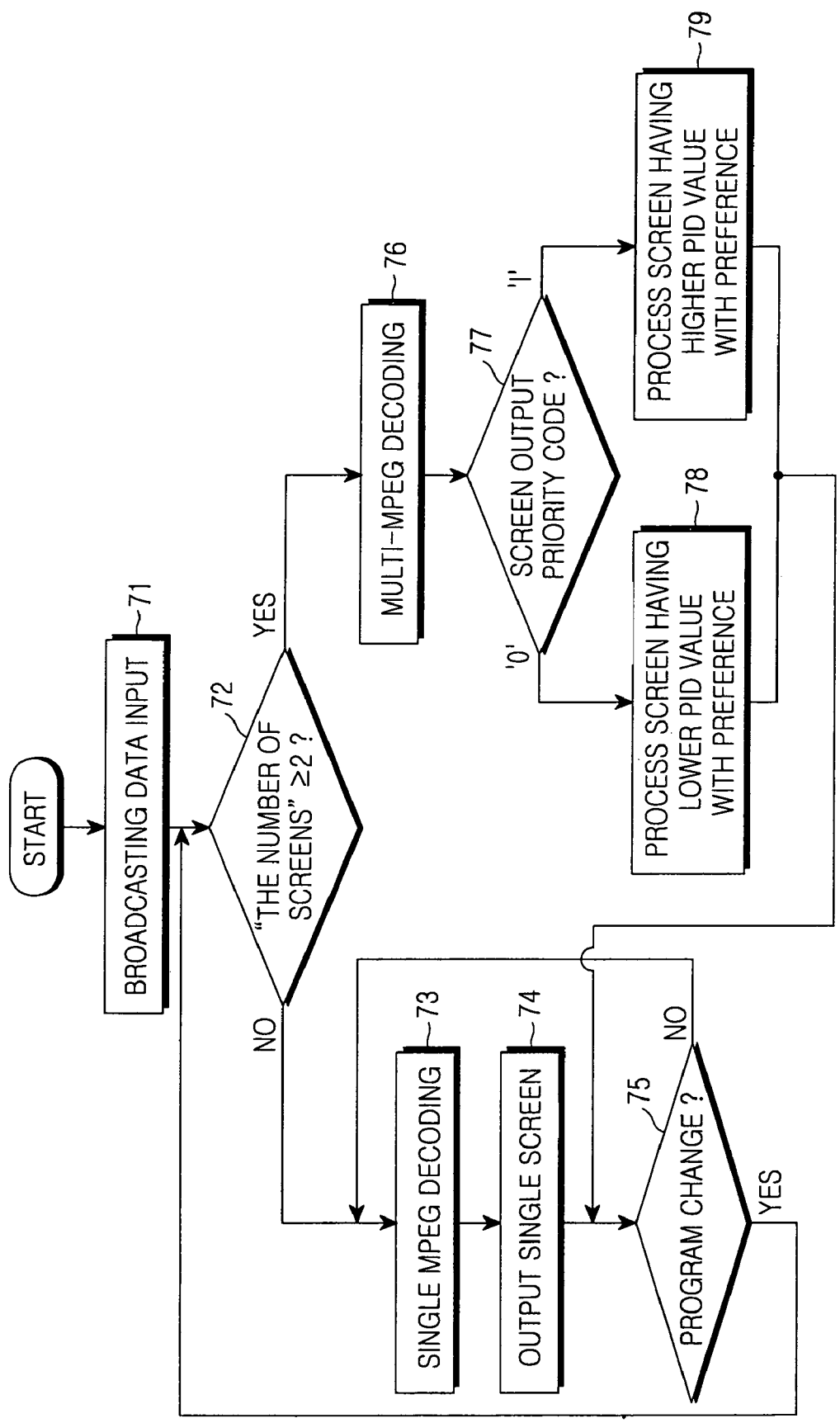
FIG. 7 is a flowchart of a method for processing a multi-screen program in the transport stream receiving apparatus capable of providing a multi-screen in a digital broadcasting system according to an embodiment of the present invention.

FIG. 7 is a flowchart of a method for processing a multi-screen program in the transport stream receiving apparatus capable of providing a multi-screen in a digital broadcasting system according to an embodiment of the present invention.

First, when broadcasting data is input (step 71), a PAT of the input broadcasting data is analyzed. Then, it is determined whether the number of screens is equal to or greater than "2" based on screen number information included in the analyzed PAT (step 72). Herein, if the number of screens is equal to or greater than "2", it represents a multi-screen program, but if the number of screens is "1", it represents a single-screen program. Such screen number information is obtained from the screen number (screen_number) field of Table 3. That is, the number of screen is "1" when the screen number field has a value of "0", and the number of screen is "2" or more when the screen number field has a value of "1".

When the input broadcasting data is a single-screen program, a single MPEG decoding is performed with respect to the input broadcasting data (step 73). Accordingly, a single screen is output (step 74).

In contrast, when the input broadcasting data is a multi-screen program, a multi-MPEG decoding is performed with respect to the input broadcasting data (step 76). In addition, output priority code values of screens are checked (step 77). Herein, the output priority code value represents the value of the priority order number (Priority_Order_number) field included in the PMT of Table 3.

Therefore, when the output priority code has a value of "0", a video stream having a lower PID is output with preference (step 78). However, when the output priority code has a value of "1", a video stream having a higher PID is output with preference (step 79).

When there is a program change while a video stream is output in step 74, 78, or 79 according to the above-mentioned manners (step 75), the procedure returns to step 72.

As described above, the present invention defines the configuration of PAT and PMT that can configure a multi-screen transport stream so as to provide a new type of broadcasting service. This in turn provides various services to users and precisely notifying the users of information about a multi-screen processing.

The method according to the present invention can be realized by a program and can be stored in a recording medium (such as a CD ROM, a RAM, a floppy disk, a hard disk, a magneto-optical disk, etc.) in a format that can be read by a computer.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An apparatus for processing a transport stream in a digital broadcasting system, the apparatus comprising:
    a channel classifying decoder to receive a multi-program transport stream (MPTS) and output a single-program transport stream (SPTS) of a selected channel using channel selection information from a user;
    a transport stream demultiplexer to demultiplex the SPTS and output a plurality of packets;
    a video/audio decoder for decoding image/voice packets;
    a data processing unit for decoding a data packet, and providing the video/audio decoder with a clock pulse for synchronizing voice and image; and
    a multi-screen controller to receive selection information about a multi-screen from the user and to enable the video/audio decoder to process the multi-screen;
    wherein a screen number field informing the number of input video signals is included in a program access table (PAT) of an SPTS corresponding to the selected channel, and wherein a program mapping table (PMT) of the SPTS corresponding to the selected channel includes a priority order number (Priority_Order_number) field for representing a priority of a program ID (PID), which is used to determine an output order of the plurality of image signals.

2. The apparatus as claimed in claim 1, wherein the plurality of packets includes an image packet, voice packet and data packet.

3. The apparatus as claimed in claim 1, wherein the multi-screen controller provides the video decoder with a control signal to process the multi-screen.

4. The apparatus as claimed in claim 1, wherein the video/audio decoder comprises:
   a multi-screen MPEG decoder far receiving the video packets for the multi-screen and decoding each of the received video packets; and
   a screen-position selection processing unit 52 for processing a screen position configuration for the decoded video packets according to the control of the multi-screen controller.

5. The apparatus as claimed in claim 4, wherein the multi-screen controller transmits a screen number (Screen_number) signal to the multi-screen MPEG decoder to enable the maid-screen MPEG decoder to check whether a single screen or a multi-screen is to be output, and determines a number of video streams to be decoded when the multi-screen is output.

6. The apparatus as claimed in claim 4, wherein the multi-screen controller transmits screen configuration information selected by the user to the screen-position selection processing unit, so as to configure a screen iii a form desired by the user and output an image signal.

7. The apparatus as claimed in claim 1, wherein the screen number field is configured using a reserved region in an existing PAT structure.

8. The apparatus as claimed in claim 1, wherein the priority order number screen number field is configured using a reserved region in an existing PMT structure.

9. A method for processing program in a transport stream receiving apparatus in a digital broadcasting system, the method comprising the steps of:
   a) analyzing a program access table (PAT) of broadcasting data to determine whether there are at least two image packets;
   b) performing signal decoding when the input broadcasting data is a single screen program having one image packet; and
   c) performing a multi-decoding when the input broadcasting data is a multi-screen program having at least two image packets;
   wherein a screen number field informing the number of input video signals is included in a program access table (PAT) of an SPTS corresponding to the selected channel, and
   wherein a program mapping table (PMT) of the SPTS corresponding the selected channel includes a priority order number (Priority_Order_number) field for representing a priority of a program ID (PID), which is used to determine an output order of the plurality of image signals.

10. The method as claimed in claim 9 wherein the step of performing a signal decoding thither includes outputting a signal screen and the step of performing a multi-decoding further includes outputting a multi-screen based on output priority codes of images.

11. The method as claimed in claim 10, further comprising a step of returning to step a), when a program changes while a screen is being output in step b) or c).

12. The method as claimed in claim 9, wherein the output priority code is a value of a priority order number (Priority_Order_number) field in a PMT.

13. The method as claimed in claim 12, wherein, when the output priority code has a value of "0", a video stream having a lower PID is output with preference, and when the output priority code has a value of "1", a video stream having a higher PID is output with preference.

14. A method of processing a transport stream in, a digital broadcasting system, the method comprising the steps of:
   decoding a multi-program transport stream (MPTS) and outputting a single-program transport stream (SPTS) of a selected channel using channel selection information from a user;
   demultiplexing the SPTS and outputting a plurality of packets;
   decoding the plurality of packets;
   determining from the plurality of packets a clock pulse for synchronizing voice and image data; and
   processing multi-screen using selection information regarding multi-screen from the user;
   wherein a screen number field informing the number of input video signals is included in a program access table (PAT) of an SPTS corresponding to the selected channel, and
   wherein a program mapping table (PMT) of the SPTS corresponding to the selected channel includes a priority order number (Priority_Order_number) field for representing a priority of a program ID (PID), which is used to determine an output order of the plurality of image signals.

15. The method as claimed in claim 14, further including the step of determining a screen number from a program access table (PAT) of an SPTS corresponding to the selected channel, wherein the screen number is the number of input video signals.

16. The method as claimed in claim 14, further including the step of determining the priority of an output order of the image data using a program mapping table (PMT) of the SPTS corresponding to the selected channel that includes a priority order number field for representing a priority of a program ID (PID).

* * * * *